US007874907B2

(12) United States Patent
Lozano et al.

(10) Patent No.: US 7,874,907 B2
(45) Date of Patent: Jan. 25, 2011

(54) DEVICES AND METHODS FOR FEATURE BALL BINGO

(75) Inventors: Carlos Lozano, Greenville, SC (US); Michael Macke, Duluth, GA (US)

(73) Assignee: Cadillac Jack, Inc., Duluth, GA (US)

( * ) Notice: Subject to any disclaimer, the term of this patent is extended or adjusted under 35 U.S.C. 154(b) by 1240 days.

(21) Appl. No.: 10/572,024

(22) PCT Filed: Aug. 23, 2005

(86) PCT No.: PCT/US2005/029686

§ 371 (c)(1), (2), (4) Date: Mar. 13, 2006

(87) PCT Pub. No.: WO2006/023808

PCT Pub. Date: Mar. 2, 2006

(65) Prior Publication Data

US 2009/0011814 A1 Jan. 8, 2009

Related U.S. Application Data

(60) Provisional application No. 60/603,959, filed on Aug. 23, 2004.

(51) Int. Cl.
*A63F 9/24* (2006.01)
*A63F 13/00* (2006.01)

(52) U.S. Cl. ............................ 463/19; 273/269; 463/16

(58) Field of Classification Search ............. 463/16–20; 273/269
See application file for complete search history.

(56) References Cited

U.S. PATENT DOCUMENTS

| | | | | |
|---|---|---|---|---|
| 5,265,877 | A | 11/1993 | Boylan et al. | |
| 5,657,991 | A | 8/1997 | Camarato | |
| 5,823,534 | A | 10/1998 | Banyai | |
| 6,012,984 | A * | 1/2000 | Roseman | 463/42 |
| 6,581,935 | B1 * | 6/2003 | Odom | 273/269 |
| 6,755,738 | B2 * | 6/2004 | Glasson et al. | 463/19 |
| 6,887,152 | B2 | 5/2005 | Stanek | |
| 2003/0125105 | A1 | 7/2003 | Bennett | |
| 2004/0173965 | A1 | 9/2004 | Stanek | |
| 2004/0259622 | A1 | 12/2004 | Duhamel | |

FOREIGN PATENT DOCUMENTS

| | | |
|---|---|---|
| WO | WO0189646 | 11/2001 |

* cited by examiner

*Primary Examiner*—Peter DungBa Vo
*Assistant Examiner*—Jasson H Yoo
(74) *Attorney, Agent, or Firm*—Greenberg Traurig

(57) ABSTRACT

An electronic bingo game and method for playing the same wherein a random number generator selects bingo balls from a predetermined range that includes regular bingo balls (210) and one or more feature balls (208). As regular bingo balls (210) are selected they are compared to the numbers on a bingo card (206). The card is marked when a match occurs. Eventually, if the spaces marked on the player's card match one or more of the winning patterns, the player receives an award. The selection of a feature ball (208) triggers a game altering function such as terminating the game and comparing the marked spaces on the bingo card to a set of winning patterns, or, alternatively, terminating the game and paying additional winnings for bingo patterns marked on the player's bingo card prior to selection of the Feature Ball (208). Other feature ball functions may also be implemented.

11 Claims, 3 Drawing Sheets

DEVICES AND METHODS FOR FEATURE BALL BINGO

CROSS REFERENCE TO RELATED APPLICATIONS

This application claims the benefit of priority to U.S. provisional patent application Ser. No. 60/603,959 entitled Feature Ball Bingo, which was filed in the United States Patent and Trademark Office on Aug. 23, 2004, the specification of which is hereby incorporated by reference.

FIELD OF THE INVENTION

The present invention relates to a gaming machine and, more particularly, to a casino-style electronic Bingo gaming machine and a method for playing the same.

BACKGROUND OF THE INVENTION

The game of Bingo has been popular around the world for hundreds of years and remains a popular game for enjoyment in homes, churches, casinos and Native American gaming facilities. Regardless of the specific form and nature of the playing environment, however, the rules of the game remain basically the same: Each participant is issued one or more unique Bingo cards with numbers appearing in an arrangement of rows and columns, usually a five-by-five matrix. An assigned individual, using a ball blower, cage or similar device, selects or "calls" numbers in response to which the players of the game search their cards for the called number and mark their cards accordingly. The first player to mark his or her card in one or more of certain predetermined patterns, usually five contiguous numbers along a vertical, horizontal or diagonal line, wins the prize for that game.

With the advent of computers, electronic forms of Bingo games, such as those employing slot-machine style cabinets and using video displays, have emerged and become increasingly popular. Many of these electronic Bingo games offer the same play options as traditional card and ball Bingo but with added benefits and features such as attractive graphics and sounds. A processor uses a random number generator to draw the balls and automatically mark the players' cards, allowing for the quick completion of game play. Two or more of these games can be networked together in order to allow multiple individuals to play a game of Bingo using a common ball draw.

Electronic Bingo games of this nature are well known in the art. For example, U.S. Pat. No. 6,581,935 discloses an electronic Bingo game which in which a random number generator selects a first set of a predetermined number of Bingo balls. The selected numbers are compared to the numbers appearing on the player's Bingo card. If a predetermined winning pattern is obtained, the player receives a reward. The random number generator then selects a second set of a predetermined number of Bingo balls. If a player obtains a cover all Bingo pattern (i.e., every space on the card is covered) from the first and second outcome sets, the player is entitled to a second award.

With the recent growth in the electronic gaming machine market, competition between manufacturers to place their equipment in available venues has become fierce. When selecting which machines to put into their facilities, the operators of gaming establishments give paramount consideration to their patrons' preferences. The problem that arises, however, is that players quickly tire of a particular game. Accordingly, there is a need in the art for new and innovative concepts associated with electronic gaming machines that serve to keep players amused and, therefore, willing to continue playing the game, in addition to attracting new players.

SUMMARY OF THE INVENTION

According to an embodiment of the invention, there is disclosed a method for implementing an electronic Bingo game which includes the step of selecting a random number from a universe of numbers where the universe of numbers includes a predefined range of Bingo numbers and at least one game altering number. The method includes evaluating the random number as it is drawn to determine if it is a number within the predefined range or if it is a game altering number. If the random number corresponds to the at least one game altering number, then a game altering function associated with the selected game altering number is performed, which includes terminating the game and comparing the pattern of marked spaces to the winning Bingo patterns.

In another embodiment of the present invention, the game altering function may include multiplying the award associated with the at least one winning Bingo pattern by a multiple associated with the selected game altering number. In yet another embodiment of the present invention, the game altering function may perform one of the following functions: (1) terminating the game, (2) multiplying the award associated with the at least one winning Bingo pattern by a multiple associated with the at least one game altering number, or (3) associating at least one additional winning Bingo pattern with the game.

According to another embodiment of the invention, disclosed is an electronic Bingo game, which includes a display capable of displaying at least one Bingo card having a plurality of spaces; at least one interface that accepts instructions from a user to initiate play of the Bingo game; a memory that stores software instructions, at least one winning Bingo pattern and pay table information corresponding to winning Bingo patterns. The electronic bingo game further includes a random number generator that randomly selects a number from a universe of numbers, which is a set of numbers that includes a predefined range of Bingo numbers and at least one game altering number. The electronic bingo game further includes a processor that controls the display, the interfaces, the random number generator, as well as processes a game altering function located in software instructions associated with at least one game altering number. The game altering function includes terminating the Bingo game and comparing the pattern of marked spaces to the winning Bingo patterns.

In another embodiment of the present invention, the game altering function of the electronic Bingo game also increases an award amount associated with the winning Bingo patterns.

In yet another embodiment of the present invention, the electronic Bingo game includes a network interface in communication with other electronic Bingo games through a remote server.

In yet another embodiment of the present invention, the game altering function of the electronic Bingo game performs one of the following functions: (1) terminating the game, (2) multiplying the award associated with the at least one winning Bingo pattern by a multiple associated with the at least one game altering number, or (3) associating at least one additional winning Bingo pattern with the game. According to another embodiment of the invention, disclosed is a server connecting at least two Bingo gaming machines which includes interfaces that receive instructions from the Bingo gaming machines and transmit game related data to the Bingo gaming machines, a memory containing a plurality of software instructions, at least one winning Bingo pattern and pay table information corresponding to the winning Bingo patterns. The electronic bingo game further includes a random number generator that randomly assigns numbers, within a predefined range of Bingo numbers, to spaces located on Bingo cards. The electronic bingo game further includes a processor for implementing the following software instructions: (1) selecting a random number from a universe of numbers, where the universe of numbers includes the predefined range of Bingo numbers in addition to at least one game altering number and (2) evaluating the random number as it is drawn to determine if it is a number within the predefined range or if it is a game altering number. If the random number is within the predefined range of Bingo numbers it is compared to the numbers assigned to the spaces on the Bingo card and, where a match occurs, the space corresponding to the match is identified. This process is repeated until the random number selected corresponds to a game altering number, then the game terminates and the pattern of marked spaces is compared to the winning Bingo patterns and an award may be paid to the player based upon the pay table information.

In another embodiment of the present invention, the server connecting at least two Bingo gaming machines further includes the game altering number being associated with a multiple that, in turn, is associated with the pay table information altering a pay out associated with the winning Bingo patterns.

In yet another embodiment of the present invention, the server connecting at least two Bingo gaming machines further includes the game altering function performing one of the following functions once the random number selected corresponds to a game altering number: (1) terminating the game, (2) multiplying the award associated with the at least one winning Bingo pattern by a multiple associated with the at least one game altering number, or (3) associating at least one additional winning Bingo pattern with the game.

BRIEF DESCRIPTION OF THE DRAWING

Figure 1:
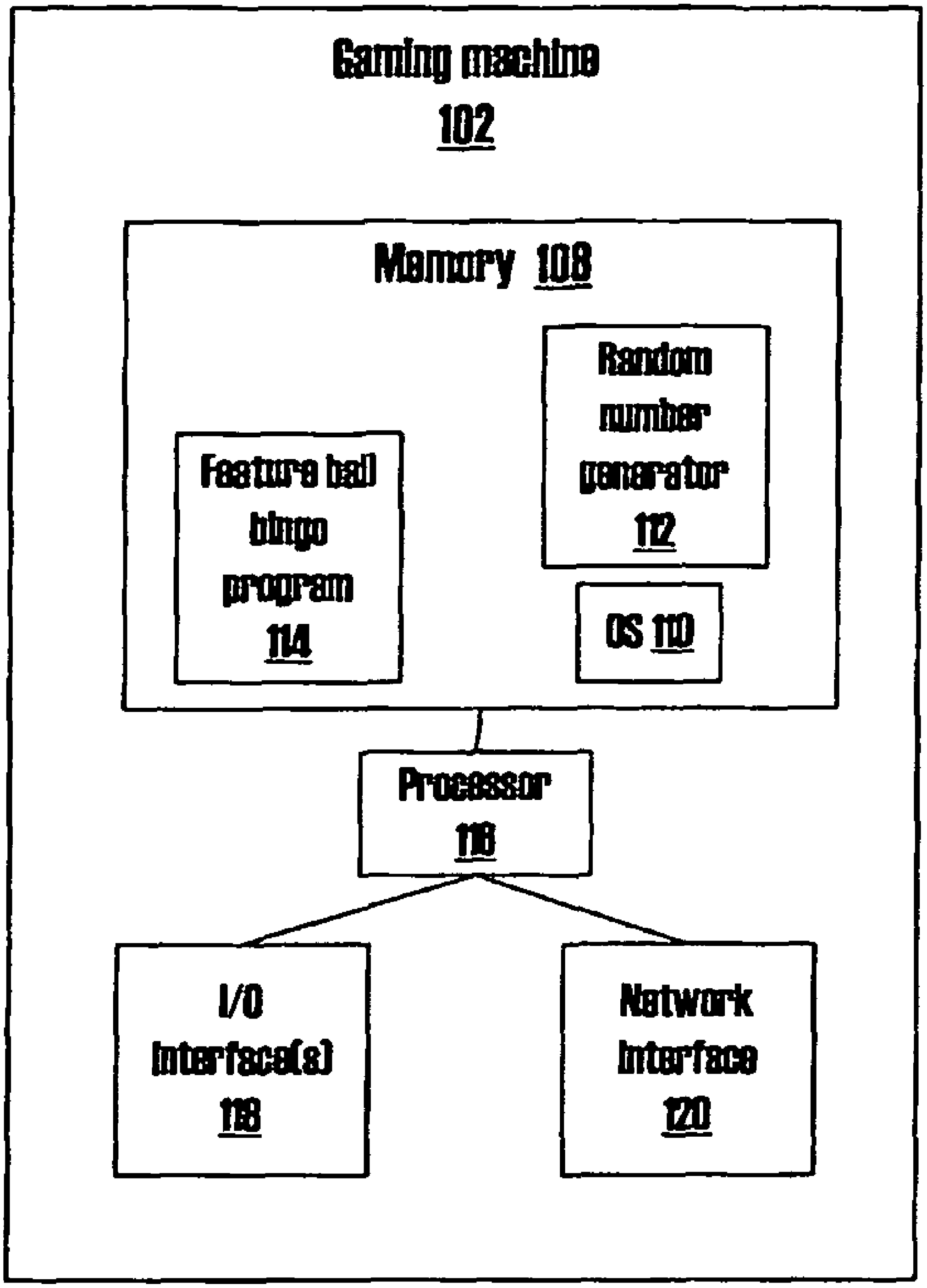

Having thus described the invention in general terms, reference will now be made to the accompanying drawings, which are not necessarily drawn to scale, and wherein:

FIG. 1 shows a block diagram of a gaming machine for playing an electronic Bingo game in accordance with the present invention.

Figure 2:
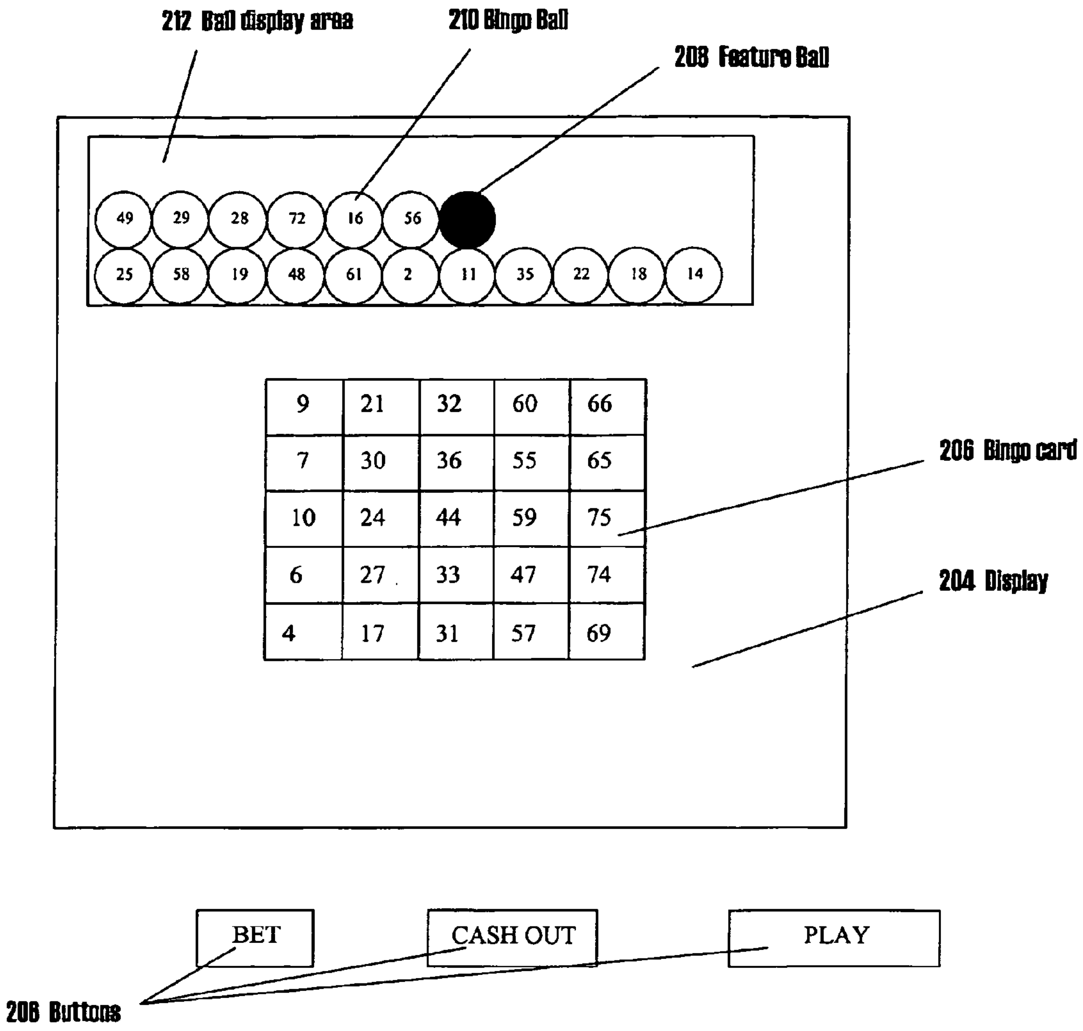

FIG. 2 shows an exemplary gaming machine with an exemplary display for playing an electronic Bingo game in accordance with the present invention.

Figure 3:
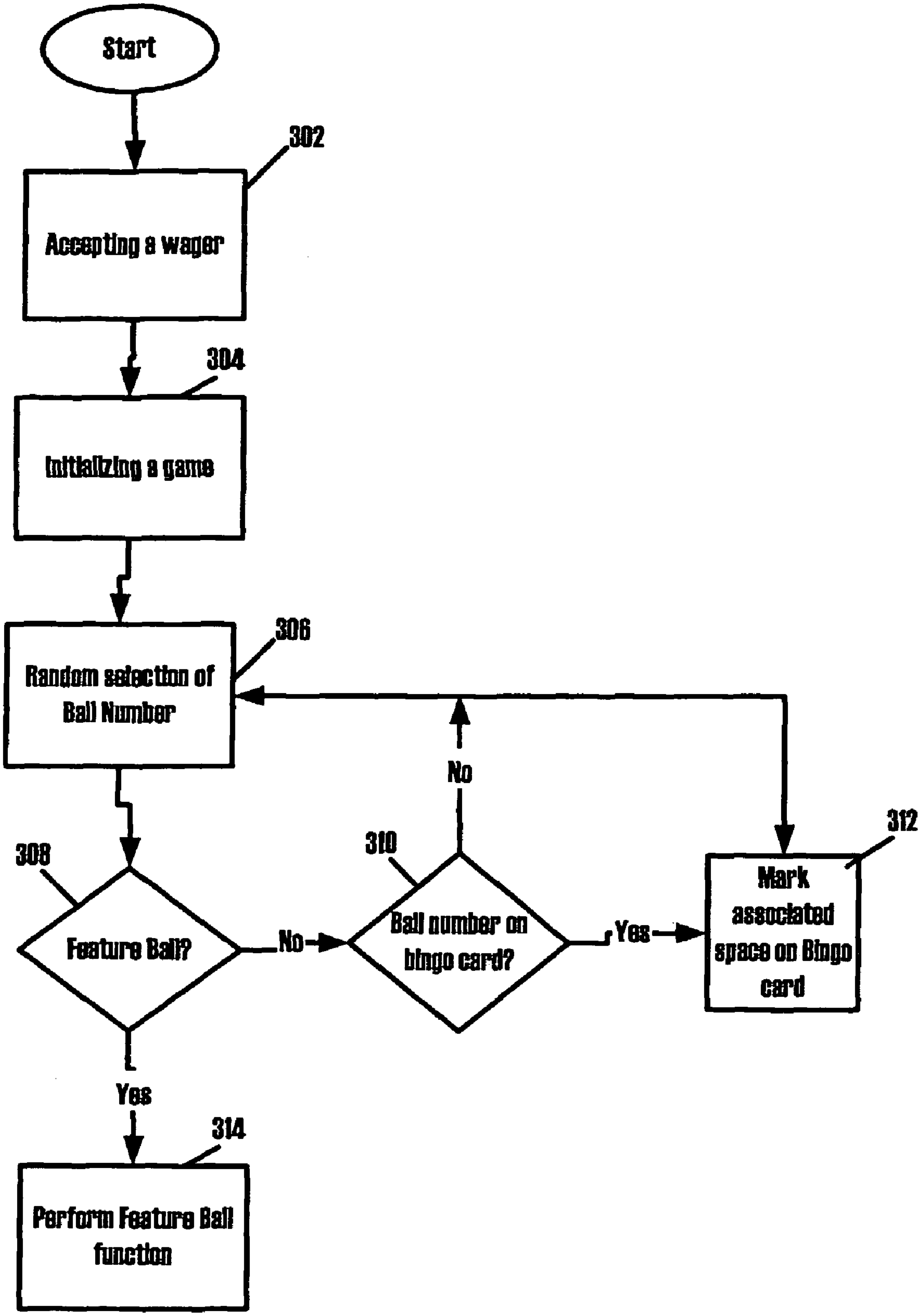

FIG. 3 shows an exemplary flowchart of a game of feature ball bingo in accordance with the present invention.

DETAILED DESCRIPTION OF THE INVENTION

The present invention is directed to an electronic bingo game which utilize Feature Balls. The Feature Balls do not correspond to a numerical value on the players' cards and their selection serves to trigger one or more game features such as immediate termination of the game or the award of a bonus prize. Upon termination of the game, players holding Bingo cards marked with game winning patterns are paid awards in accordance with a predetermined pay schedule.

The present invention will now will be described more fully hereinafter with reference to the accompanying figures, in which some, but not all embodiments of the invention are shown. Indeed, the present invention may be embodied in many different forms and should not be construed as limited to the embodiments set forth herein. Rather, these embodiments are provided so that this disclosure will satisfy applicable legal requirements.

The present invention is described below with reference to a block diagram and flowchart according to an embodiment of the invention. It will be understood that each block of the block diagram and flowchart, and combinations of blocks in the block diagram and flowchart, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functionality of each block of the block diagram and flowchart, or combinations of blocks in the block diagram and flowchart discussed in detail in the descriptions below.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

Accordingly, blocks of the block diagram and flowchart support combinations of means for performing the specified functions, combinations of steps for performing the specified functions and program instruction means for performing the specified functions. It will also be understood that each block of the block diagram and flowchart, and combinations of blocks in the block diagram and flowchart, can be implemented by special purpose hardware-based computer systems that perform the specified functions or steps, or combinations of special purpose hardware and computer instructions.

The inventions may be implemented through an application program running on an operating system of a computer. The inventions also may be practiced with other computer system configurations, including hand-held devices, multiprocessor systems, microprocessor based or programmable consumer electronics, mini-computers, mainframe computers, etc.

Application programs that are components of the invention may include routines, programs, components, data structures, etc. that implement certain abstract data types, perform certain tasks, actions, or tasks. In a distributed computing environment, the application program (in whole or in part) may be located in local memory, or in other storage. In addition, or in the alternative, the application program (in whole or in part) may be located in remote memory or in storage to allow for the practice of the inventions where tasks are performed by remote processing devices linked through a communications network. Exemplary embodiments of the present invention will hereinafter be described with reference to the figures, in which like numerals indicate like elements throughout the several drawings.

The present invention provides an electronic gaming machine for playing Bingo having a computer processor and a video display. The game may either be a "stand alone" device in which the data processor resides on the game or a network of individual game machines in which case the data processor resides on a central computer system or server that controls each game machine.

FIG. 1 shows a block diagram of a gaming machine 102 for playing an electronic Bingo game in accordance with the present invention. In the exemplary embodiment of FIG. 1, the gaming machine 102 includes various electronic components necessary to operate the gaming machine 102. These components may include memory 108, a processor 116, I/O interfaces 118, and, in certain exemplary embodiments of the present invention, a network interface 120. The various functions of the gaming machine 102 discussed herein are controlled by the processor 116 utilizing various software programs stored in memory 108.

The game machine 102 contains one or more I/O interfaces 118. These interfaces may include a display, touch-screen display, microphones, speakers, buttons, mouse, joystick, a keyboard or other user interfaces appreciable by one of ordinary skill in the art. The I/O interfaces 118 may also include card readers, scanners disk drives, USB ports, or other such I/O interfaces appreciated by one of ordinary skill in the art capable of accepting information relating to wager amounts, game credits, etc. In an exemplary embodiment of the present invention, the gaming machine 102 also includes a monetary input interface as part of its I/O interfaces 118 through the use of which a player receives game credits available to wager. In an exemplary embodiment of the present invention, the monetary input interface is a bill acceptor into which a player inserts paper currency and receives credit on the gaming machine 102 for the amount deposited. Alternatively, the monetary input interface is a ticket reader into which the player places a paper ticket bearing an encoded monetary value into the monetary input interface and is credited with the monetary value. The monetary input interface may also be a coin slot, credit card reader or other means known in the art. Further, the I/O interfaces 118 also may include printers, coin dispensers, ticket dispenser and other such I/O interfaces appreciated by one of ordinary skill capable of dispensing a user's remaining credits and/or winnings (i.e., "cashing out").

Also included in the gaming machine 102 is a memory 108 where various game data such as winning Bingo card patterns and the pay schedule (i.e., pay tables, which are utilized to determine the value of the awards payable for such patterns) are stored. The memory also stores a random number generator program 112, feature ball bingo software program 114, and an O/S (Operating System) 110 for use by the processor 116 in controlling the various functionality of the gaming machine 102, such as the calling of various software routines and operating various system hardware and interfaces such as the I/O interfaces 118 and network interfaces 120. In alternative embodiments the software that implements the random number generator and Feature Ball Bingo can be integrated into one software program. In additional alternative embodiments, the random number generator could utilize additional hardware for more complex generation of number selection and/or to provide additional security and integrity to the operation of the Bingo game.

The memory 108 resides within the gaming machine 102 in the case of a stand alone gaming machine 102, or in an alternative embodiment of the present invention, the memory may reside remote from the gaming machine 102. For example, the memory 108, and some or all of its stored content, may reside on a central machine or server where two or more game machines 102 are networked together. In such a case, the gaming machine communicates with the central machine or server through a network interface 120. The network interface allows the game machine 102 to simply communicate with a transmission portal such as a server or router, and the feature ball bingo program 114 functions could be done remote from the game machine 102 all together.

In an exemplary embodiment of the present invention, a user may enter wager information utilizing the gaming machine's I/O interface 118. The wager information is stored in the memory 108. Next, the processor 116 utilizes an operating system (O/S) 110, which in turn calls the feature ball bingo program 114 to run the feature ball bingo process which is discussed in further detail below in reference to FIG. 3. As part of the feature ball bingo operation, the random number generator 112, under the control of the processor 116, generates random numbers within a given number range and are in turn compared to number's associated with the spaces on a user's Bingo card, as shown in FIG. 2.

The random generator may also randomly select a game altering number or symbol referred to as a feature ball. Each feature ball has a game altering function associated with it that alters the Bingo game in some way that could either benefit or hinder the user in the Bingo game. Such functions associated with one or more feature balls may include terminating the random number selection thereby ending the game; multiplying a user's potential winnings by a particular number, providing free spaces on a user's Bingo card, awarding specific prizes or monetary awards regardless of the outcome of the Bingo game or providing additional potential winning Bingo card patterns to the user. Other functionality associated with the feature balls may also be utilized. Further, when more than one player is playing the Bingo game against each other, the functionality of feature balls can be such that it benefits or hinders every player the same or, alternatively, may benefit one or more players to the detriment of other players or without effecting the position of other players at all.

When a game is over, the user's winnings are determined by the processor 116 running the feature ball bingo program 114. The user may continue to play a new game or the player may "cash out." When "cashing out," the processor 116 operates the dispensing of the a user's remaining credits and/or winnings. After one user ends his or her play, the gaming machine 102 is reset for another user to begin play.

In an alternative embodiment of the present invention, a number of game machines 102 may be in communication with a server through a network. The network can be a dedicated private network including a LAN, WAN, T1 connection, or a public network such as the Internet. The network can also be one which supports any networking protocol including Internet Protocol, FTP, Telnet, TCP/IP, Point to Point Protocol (PPP), Challenge Handshake Authentication Protocol (CHAP), or another public or private networking protocol. Secured or encrypted network protocols such as secured HTTPS protocol and other secure methods of data transfer over public networks appreciable by one of ordinary skill in the art and/or user ID and password protected log-in security features may also be utilized. In an exemplary embodiment of the present invention, the use of a dedicated server allows the game machines 102 to be remotely accessed through the Internet or some other network such as a private Intranet, LAN, WAN, T1 connection, or other networking configurations appreciable by one of ordinary skill in the art. The requisite architecture for networking a series of games is well known in the art and is not discussed further herein.

In an embodiment of the present invention that utilizes the above described network configuration, a plurality of machines may be networked together in which case a processor and the operational software that implements one or more aspects of the Feature Ball Bingo game may reside on a central computer or server and control each individual gaming machine in the network. In such an exemplary embodiment of the present invention, many players may participate in the same Bingo game.

FIG. 2 shows an exemplary gaming machine with an exemplary display 204 for playing an electronic Bingo game in accordance with the present invention. In the exemplary embodiment shown in FIG. 2, the gaming machine includes a series of buttons 202 for use as a user interface for controlling game play. In the exemplary embodiment of the present invention shown in FIG. 2, the buttons 202 include a "Bet" button for controlling the amount of the wager placed on a particular game, a "Play" button, for starting the game and a "Cash Out" button allowing the player to retrieve the monetary value remaining upon completion of play. In alternative embodiments of the present invention, the display 204 has a "touch screen" including icons representing the same features associated with the buttons 202 of FIG. 2. Through the use of a touch-screen a user can activate the features associated with the icons by touching the appropriate area of the display.

In the embodiment illustrated in FIG. 2, the Bingo card 206 appears in the form of a five-by-five matrix forming twenty-five spaces. The interface may show multiple five-by-five Bingo cards. However, any arrangement of rows and columns may be used. As shown in FIG. 2, the Bingo card 206 is randomly assigned a number for each of the spaces on the Bingo card from a predetermined range of Bingo numbers. In the described embodiment of the present invention shown in FIG. 2, the range is one through seventy-five, although any range of numbers may be used. In alternative embodiments of the present invention one or more of the spaces of the Bing card 206 may not be assigned a number but may be considered a free space, or may be associated with a Feature Ball function.

When a game is in progress a random number generator generates numbers from what is referred to as the "universe of Bingo numbers." The universe of Bingo numbers consists of the possible Bingo numbers assignable to the Bingo card (e.g., one through seventy-five) and numbers or other symbols associated with one or more Feature Balls (e.g., Feature Ball Numbers). For example, in a Bingo game with potential Bingo numbers of one through seventy-five and containing three Feature Balls, the universe of numbers would contain seventy-eight possibilities for the random number generator to select. Once a selection has been made by the random number generator the selected ball, whether it is a Feature Ball 210 or a regular Bingo Ball 208, is shown in the ball display area 212 of the display 204. Accordingly, in FIG. 2, the random number generator has selected seventeen regular Bingo Balls 208 and one Feature Ball 210.

FIG. 3 shows an exemplary flowchart of a game of feature ball bingo in accordance with the present invention. As described with reference to FIG. 3, to initiate play of the Bingo game, the player first invokes step 302 to place a wager. To place a wager, the user inputs currency or a ticket bearing game credits into one of the input interfaces of the gaming machine. In an exemplary embodiment of the present invention, the gaming machine indicates the amount of money or credit available for the player to bet during play. The player then proceeds to indicate the amount to be wagered on a particular play of the game up to the lesser of the available game credits or the maximum allowable bet on the gaming machine. In an exemplary embodiment of the present invention, the wager indication may simply be the pressing of the "Bet" button.

After the placing of a wager, step 304 is invoked to initialize the game by randomly assigning a number to each of the spaces on the Bingo card from the predetermined range of Bingo numbers. Upon depression of the Play button step 306 is invoked to begin the game by having a random number generator select numbers from the universe of Bingo numbers. As the random number generator selects numbers from the universe, graphical representations of Bingo balls are displayed in the ball display area on the video display of the gaming machine.

According to step 308, if the number selected is within the range of Bingo numbers, then step 310 is invoked and a Regular Bingo ball is displayed in the ball display area with a numerical marking corresponding to the number selected by the random number generator. The number associated with the regular Bingo ball is compared to the numbers appearing on the Bingo card. If the number on the ball matches a number appearing in one of the spaces on the Bingo card, then step 312 is invoked to mark that space by shading or similar means appreciable by one of ordinary skill in the art. If the number on the ball does not match a number appearing in one of the spaces on the Bingo card then step 306 is invoked again for another random selection of a number from the universe of Bingo numbers.

This process continues until a game altering number or symbol, referred to as a Feature Ball, is drawn in step 308 at which point the step 314 is invoked to perform the function associated with the selected Feature Ball. In an exemplary embodiment of the present invention a Feature Ball is selected if the number randomly selected from the universe of Bingo numbers is outside the range of Bingo numbers. Step 314 displays a Feature Ball in the ball display area. In an exemplary embodiment of the present invention, the Feature Ball bears no numerical markings and is displayed as a solid color, shaded or marked by other marking means useful in distinguishing it from the regular Bingo balls displayed in the ball display area appreciable by one of ordinary skilled in the art. The detection of a Feature Ball in step 308 may trigger one of several game altering event or function in step 314. As shown in the exemplary embodiment of FIG. 3, these events include terminating the game causing no additional Bingo balls to be randomly selected drawn. At this point, the marked spaces on the Bingo card would be compared to winning Bingo card patterns. If the spaces marked on the Bingo card form one or more winning Bingo card patterns, the player is paid an award based upon a pay schedule contained in the memory. If, however, no winning patterns are formed on the Bingo card prior to the selection of the Feature Ball, the game terminates without a winner.

In exemplary embodiments of the present invention, the winning patterns consist of five contiguous spaces along a horizontal, vertical or diagonal line, although any combination of marked spaces may be defined as a winning pattern. Thus, the greater the number of regular Bingo balls selected by the random number generator prior to the selection of a Feature Ball, the greater the player's chances are of forming a game winning pattern.

Another game event that may be associated with the selection of a particular Feature Ball may include a pay multiplier for winning Bingo patterns formed on the Bingo card prior to the selection of the Feature Ball. For example, if, through the selection of regular Bingo balls a player forms a game winning pattern, the drawing of the particular Feature Ball may serve to increase the award indicated by the pay schedule by some particular multiple. Other game events that may be associated with the selection of a Feature Ball may be the addition of winning patterns associated with the Bingo game not included with the original set of winning patterns, awarding specific prizes, monetary or otherwise, for particular patterns or number(s) selected, as well as other game events appreciable by one of ordinary skill in the art.

It should be understood that the foregoing discussions merely relate to illustrative, exemplary embodiments of the invention. Therefore, it should be further understood that various modifications may be made to the exemplary embodiments herein without departing from the spirit and scope of the invention, which will be apparent to one of ordinary skill in the art in light of the disclosure herein.

The invention claimed is:

1. An electronic method of implementing an electronic Bingo game on a Bingo gaming device comprising:

providing a processor in the Bingo gaming device, said processor programmed to perform the steps of:

selecting a random number from a universe of numbers, wherein the universe of numbers includes a predefined range of conventional Bingo numbers and at least one game altering feature ball said game altering feature ball not within the predefined range of conventional Bingo numbers;

evaluating the random number as it is drawn as either a number within the predefined range or the at least one game altering feature ball;

identifying a bingo space on a bingo card corresponding to the random number thereby creating a Bingo pattern; and if the random number corresponds to the at least one game altering feature ball, performing a game altering function associated with the at least one game altering feature ball, wherein the game altering function includes terminating the game and comparing the Bingo pattern to at least one winning Bingo pattern.

2. The method of claim 1, wherein the game altering function further includes multiplying an award associated with the at least one winning Bingo pattern by a multiple associated with the at least one game altering feature ball.

3. A method of implementing an electronic Bingo game comprising:

providing a processor in the electronic Bingo game, said processor programmed to perform the steps of:

pre-establishing a set of one or more winning Bingo patterns;

selecting a random number from a universe of numbers, wherein the universe of numbers includes a predefined range of conventional Bingo numbers and at least one game altering feature ball, said game altering feature ball not within the predefined range of conventional Bingo numbers;

evaluating the random number as it is drawn as either a number within the predefined range or the at least one game altering feature ball;

identifying a Bingo space on a Bingo card corresponding to the random number thereby creating a Bingo pattern; and if the random number corresponds to the at least one game altering feature ball, performing a game altering function associated with the at least one game altering feature ball, wherein the game altering function performs one of the steps of terminating the game, multiplying an award associated with said Bingo pattern if said Bingo pattern is included in the set of one or more winning Bingo Patterns by a multiple associated with the at least one game altering ball, and associating at least one additional winning Bingo pattern with the game.

4. An electronic Bingo game comprising:

a display, wherein the display is capable of displaying at least one Bingo card having a plurality of spaces;

at least one interface that accepts instructions from a user to initiate play of the Bingo game;

a memory, wherein the memory stores a plurality of software instructions, at least one winning Bingo pattern and pay table information corresponding to the at least one winning Bingo pattern;

a random number generator in the form of a program stored in a memory location that randomly selects a number from a universe of numbers, wherein the universe of numbers includes a predefined range of conventional Bingo numbers and at least one game altering feature ball, said game altering feature ball not within the predefined range of conventional Bingo numbers;

a processor identifying a Bingo space on a bingo card corresponding to the random number thereby creating a Bingo pattern; and the processor controlling the display, the at least one interface and the random number generator, wherein the processor is capable of processing a game altering function located in the plurality of software instructions associated with at least one game altering feature ball, wherein the game altering function includes terminating the game and comparing the Bingo pattern to at least one winning Bingo pattern.

5. The electronic Bingo game of claim 4, wherein the game altering function increases an award amount associated with the at least one winning Bingo pattern.

6. An electronic Bingo game comprising:

a display, wherein the display is capable of displaying at least one Bingo card having a plurality of spaces;

at least one interface that accepts instructions from a user to initiate play of the Bingo game;

a memory, wherein the memory stores a plurality of software instructions, at least one winning Bingo pattern and pay table information corresponding to the at least one winning Bingo pattern;

a random number generator in the form of a program stored in a memory location that randomly selects a number from a universe of numbers, wherein the universe of numbers includes a predefined range of conventional Bingo numbers and at least one game altering feature ball, said game altering feature ball not within the predefined range of conventional Bingo numbers;

a processor identifying a Bingo space on a Bingo card corresponding to the random number thereby creating a Bingo pattern; and the processor controlling the display, the at least one interface and the random number generator, wherein the processor is capable of processing a game altering function located in the plurality of software instructions associated with at least one game altering feature ball, wherein the game altering function performs one of the functions of terminating the game, multiplying an award with said Bingo pattern if said Bingo pattern is at least one winning Bingo pattern by a multiple associated with the at least one game altering feature ball, and associating at least one additional winning Bingo pattern with the game.

7. A server connecting at least two Bingo gaming machines comprising:

at least one interface that receives instructions from at least one Bingo gaming machine and transmits game related data to the at least one Bingo gaming machine;

a memory, wherein the memory stores a plurality of software instructions, at least one winning Bingo pattern and pay table information corresponding to the at least one winning Bingo pattern;

a random number generator in the form of a program stored in a memory location that randomly assigning numbers to each of a plurality of spaces located on at least one Bingo card, the numbers being within a predefined range of conventional Bingo numbers; and a processor, wherein the processor implements the following software instructions:

(a) selecting a random number from a universe of numbers, the universe comprising the predefined range of conventional Bingo numbers in addition to at least one game altering feature ball, said game altering feature ball not within the predefined range of conventional Bingo numbers; and (b) evaluating the selected random number as either a number within the predefined range or the at least one game altering feature ball and (i) if the selected random number is within the predefined range of conventional Bingo numbers, comparing the random number to the numbers assigned to the Bingo card and, where a match occurs, controlling a display to identify the space corresponding to the match thereby forming a Bingo pattern, or (ii) if the selected random number corresponds to the at least one game altering number, terminating the game and comparing the Bingo pattern to the at least one winning Bingo pattern and paying an award to the player based upon the pay table information; and (c) repeating steps (a) and (b) until a Bingo game is terminated.

8. The server connecting at least two Bingo gaming machines of claim 7, wherein the game altering feature ball is a multiple associated with the pay table information altering a pay out associated with the at least one winning Bingo pattern.

9. A server connecting at least two Bingo gaming machines comprising:

at least one interface that receives instructions from at least one Bingo gaming machine and transmits game related data to the at least one Bingo gaming machine;

a memory, wherein the memory stores a plurality of software instructions, at least one winning Bingo pattern and pay table information corresponding to the at least one winning Bingo pattern;

a random number generator in the form of a program stored in a memory location that randomly assigning numbers to each of a plurality of spaces located on at least one Bingo card, the numbers being within a predefined range of conventional Bingo numbers; and a processor, wherein the processor implements the following software instructions:

(a) selecting a random number from a universe of numbers, the universe comprising the predefined range of conventional Bingo numbers in addition to at least one game altering feature ball, said game altering feature ball not within the predefined range of conventional Bingo numbers;

(b) evaluating the selected random number as either a number within the predefined range or the at least one game altering feature ball and (i) if the selected random number is within the predefined range of conventional Bingo numbers, comparing the random number to the numbers assigned to the Bingo card and, where a match occurs, controlling a display to identify the space corresponding to the match thereby forming a Bingo pattern, or (ii) if the selected random number corresponds to the at least one game altering feature ball, performing one of the functions of terminating the game, multiplying an award associated with the Bingo pattern if said Bingo pattern is at least one winning Bingo pattern by a multiple associated with the at least one game altering feature ball, and associating at least one additional winning Bingo pattern with the game; and (c) repeating steps (a) and (b) until a Bingo game is terminated.

10. An electronic Bingo game comprising:

a display, wherein the display is capable of displaying at least one Bingo card having a plurality of spaces;

at least one interface that accepts instructions from a user to initiate play of the Bingo game;

a memory, wherein the memory stores a plurality of software instructions, at least one winning Bingo pattern and pay table information corresponding to the at least one winning Bingo pattern;

a random number generator in the form of a program stored in a memory location that randomly assigning numbers to each of the plurality of spaces located on at least one Bingo card, the numbers being within a predefined range of conventional Bingo numbers; and a processor, wherein the processor implements the following software instructions:

(a) selecting a random number from a universe of numbers, the universe comprising the predefined range of conventional Bingo numbers in addition to at least one game altering feature ball, said game altering feature ball not within the predefined range of conventional Bingo numbers;

(b) evaluating the selected random number as either a number within the predefined range or the at least one game altering feature ball and (i) if the selected random number is within the predefined range of conventional Bingo numbers, comparing the random number to the numbers assigned to the Bingo card and, where a match occurs, controlling the display to identify the space corresponding to the match thereby forming a Bingo pattern, or (ii) if the selected random number corresponds to the at least one game altering feature ball, terminating the game and comparing the Bingo pattern to the at least one winning Bingo pattern and paying an award to the player based upon the pay table information; and (c) repeating steps (a) and (b) until a Bing game is terminated.

11. The electronic Bingo game of claim 10, wherein the game altering feature ball is a multiple associated with the pay table information altering a pay out associated with the at least one winning Bingo pattern.

* * * * *